US009463892B2

(12) United States Patent
Siegenbrink

(10) Patent No.: US 9,463,892 B2
(45) Date of Patent: Oct. 11, 2016

(54) LABELING DEVICE WITH ELECTRONIC DISTANCE MONITORING

(71) Applicant: Multivac Marking & Inspection GmbH & Co. KG, Enger (DE)

(72) Inventor: Daniel Siegenbrink, Bielefeld (DE)

(73) Assignee: MULTIVAC MARKING & INSPECTION GMBH & CO. KG, Enger (DE)

( * ) Notice: Subject to any disclaimer, the term of this patent is extended or adjusted under 35 U.S.C. 154(b) by 19 days.

(21) Appl. No.: 14/656,366

(22) Filed: Mar. 12, 2015

(65) Prior Publication Data

US 2015/0259089 A1 Sep. 17, 2015

(30) Foreign Application Priority Data

Mar. 14, 2014 (EP) .................................... 14160019

(51) Int. Cl.

| | |
|---|---|
| ***B32B 41/00*** | (2006.01) |
| ***B65C 9/40*** | (2006.01) |
| ***B65C 1/02*** | (2006.01) |
| ***B65C 9/18*** | (2006.01) |
| ***B65C 9/02*** | (2006.01) |

(52) U.S. Cl.

CPC ................. *B65C 9/40* (2013.01); *B65C 1/021* (2013.01); *B65C 9/02* (2013.01); *B65C 9/1876* (2013.01)

(58) Field of Classification Search

CPC .................................. B65C 9/40; B65C 9/02

USPC ........... 156/4, 229, 230, 247, 249, 350, 369, 156/378, 379, 389, 391, 538, 542, 556, 557, 156/566, DIG. 28, DIG. 37, DIG. 42

See application file for complete search history.

(56) References Cited

U.S. PATENT DOCUMENTS

2013/0312893 A1* 11/2013 Austermeier ......... B65C 9/1884 156/60

FOREIGN PATENT DOCUMENTS

| | | | |
|---|---|---|---|
| DE | 10228243 | A1 | 1/2004 |
| DE | 102006047488 | A1 | 4/2008 |
| DE | 102008007890 | A1 | 8/2009 |

OTHER PUBLICATIONS

Ying-Hao Yu et al, "Relative Distance Estimation for Indoor Multi-robot Control Using Monocular Digital Camera", https://opus.lib.uts.edu.au/research/bitstream/handle/10453/11173/2008008367OK.pdf?sequence=1, 2009.*

* cited by examiner

*Primary Examiner* — Michael N Orlando
*Assistant Examiner* — Joshel Rivera
(74) *Attorney, Agent, or Firm* — Husch Blackwell LLP

(57) ABSTRACT

The invention relates to a labeling device and to a method for operating such a labeling device on a deep-drawing packaging machine. The labeling device includes two cross-web labelers, each displaced on one common guide system, and each having a drive and power supply. The labeling device further includes a safety controller configured to calculate a distance between the two cross-web labelers and interrupt the power supply of each drive of the cross-web labelers when the calculated distance is below an invariably predefined safety distance so as to ensure a reliable deactivation during the displacement of the cross-web labelers in the event of a fault.

7 Claims, 3 Drawing Sheets

LABELING DEVICE WITH ELECTRONIC DISTANCE MONITORING

CROSS-REFERENCE TO RELATED APPLICATIONS

This Application claims priority to European Patent Application Number 14160019.7 filed Mar. 14, 2014, to Daniel Siegenbrink, currently pending, the entire disclosure of which is incorporated herein by reference.

FIELD OF THE INVENTION

The present invention relates to a labeling device for a deep-drawing packaging machine. The present invention also relates to a method for operating a labeling device for a deep-drawing packaging machine

BACKGROUND OF THE INVENTION

A typical cross-web labeler for a packaging machine is disclosed in DE 102 28 243 A1. The construction details of a cross-web labeler are also disclosed in DE 102 28 243 A1, the entire disclosure of which is incorporated herein by reference. In general, cross-web labelers are characterized by applying labels to packagings, crosswise to the transport direction of these packagings, along a packaging machine, typically along a row of packagings.

In addition, a deep-drawing packaging machine comprising a labeling device with two placement casings for applying labels to the packagings is disclosed in DE 10 2006 047 488 A1. Labeling devices of this type are provided behind a protective enclosure so that personal protection safety distances during the simultaneous movement of the placement casings may be disregarded as the danger points are inside the protective enclosure. Otherwise, the required safety distances between the labelers would create a greater space requirement for the deep-drawing packaging machine. The drawback of such protective enclosures is the great constructive and cost-intensive expenditure and the poor accessibility of the labeling device.

SUMMARY OF THE INVENTION

It is an object of the present invention to provide a labeling device for a deep-drawing packaging machine that is devoid of the above-mentioned drawbacks.

A labeling device for a packaging machine according to one embodiment of the present invention may comprise two cross-web labelers, wherein each cross-web labeler has its own motor drive, and both cross-web labelers have one common work area. The labeling device may be characterized in that each cross-web labeler includes a distance measuring system, and that the labeling device includes a safety controller which may have inputs for the distance measuring systems and two relay outputs for interrupting a power supply of the motor drives. The safety controller may thus be capable of directly obtaining the information about the position of each cross-web labeler along the common work area, and in particular, along a shared guide system. The relay outputs may permit a direct and reliable disconnection of the drives of the cross-web labelers from the power supplies thereof and can cause a standstill of the cross-web labelers so as to prevent accidents or injuries of the operating staff. The relay outputs can be connected to contactors for interrupting the power supply of the drives passed via the contactors.

The safety controller may comprise a processor with a program. In one embodiment, the safety controller calculates the distance of the two cross-web labelers relative to each other on the basis of the information received from the distance measuring systems, such as a counter value. According to one embodiment of the present invention the “distance of the two cross-web labelers” implies the clear distance between the two cross-web labelers which can be measured in a production direction of an associated packaging machine, such as, for example, the clear distance between the label dispensers or the label reels of the two cross-web labelers. The distance measuring system used may be a linear distance measuring system along the guide system of the labeler or a shaft encoder on the driving axle of a stepper motor or servomotor of the drives.

The program, in particular, software in the processor of the safety controller, may be unalterable by a controller of the deep-drawing packaging machine or a controller of the cross-web labelers themselves. The program, in particular, calculation software, may instead be “burned” permanently so as to be assessed as “safe” according to prescribed tests. A safety controller of this type may comply with the safety category 4 according to the European Standard EN 954-1 relating to the switching-off behavior of the drives. It may be advantageous to reliably determine the position of the cross-web labelers by means of absolute linear or rotative distance measuring systems and calculate at all times, on the basis thereof, the current distance of the cross-web labelers relative to each other. Alternatively, incremental distance measuring systems may be employed which are referenced by a reference sensor at a reference position each time the deep-drawing packaging machine is switched on.

The safety controller can be configured to switch the relay outputs such that the drives are disconnected from the power supply by means of switching contacts, which may be contactors, when the calculated distance is below a value for a safety distance between the cross-web labelers invariably fixed in the program of the safety controller.

In one embodiment, the predetermined safety distance is at least 500 mm so as to reliably prevent an operator standing between the two labelers from being squashed or pushed by the labelers.

In one embodiment of the present invention, each distance measuring system is an absolute measuring system, e.g., an absolute shaft encoder on the drive of the labeler for the displacement along a production direction, so that a referencing operation when the deep-drawing packaging machine is switched on may be waived, as compared to an incremental distance measuring system. Alternatively, an absolute linear measuring system may be provided in each case, which transmits the position of the respective labeler along the shared work area to the safety controller directly.

In one embodiment a deep-drawing packaging machine is provided with such a labeling device.

A method for operating a labeling device on a deep-drawing packaging machine, according to one embodiment of the present invention where the labeling device may comprise two cross-web labelers, each having its own motor drive and sharing one common work area, may include steps where a safety controller determines the distance between the two cross-web labelers and disconnects the drives of the cross-web labelers from a power supply when the determined distance is below a predefined safety distance.

In one embodiment, the safety controller can determine the distance of the cross-web labelers relative to each other by means of a distance measuring system for each drive of the cross-web labelers.

The distance measuring system may be an absolute measuring system, as an absolute measuring system has the advantage that it merely has to be referenced once when the labeling device is set up, and no longer has to carry out a referencing operation in the future when the labeling device, along with the deep-drawing packaging machine, is switched on or off position.

In one embodiment, the safety distance value stored in the safety controller is invariable.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Like components in the figures are consistently designated with like reference numbers.

DETAILED DESCRIPTION OF THE INVENTION

Figure 1:
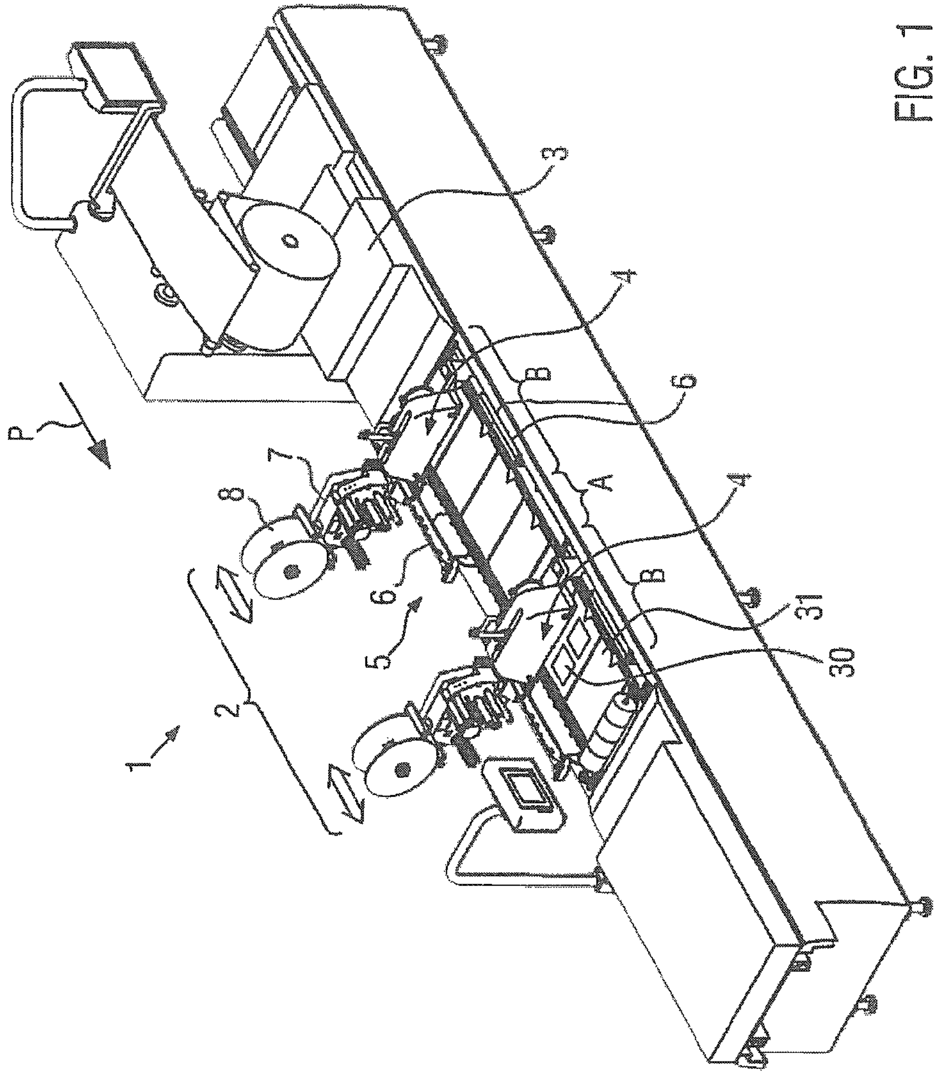
FIG. 1 Prior Art
FIG. 1 is a side perspective view of a deep-drawing packaging machine having two cross-web labelers according to the prior art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a deep-drawing packaging machine 1 including a labeling device 2 according to the prior art. The labeling device 2 is provided in a production direction P of the deep-drawing packaging machine 1 downstream of a sealing station 3. The labeling device 2 comprises two cross-web labelers 4 which are arranged consecutively in the production direction P of the deep-drawing packaging machine 1 and each cross-web labeler 4 has its own guide system 5. Each cross-web labeler 4 also has its own work area B which is defined and delimited across the length of guides 6 of the guide system 5. Both cross-web labelers 4 can move simultaneously along their guide system 5 in and opposite to the production direction P, as shown by the double arrows in FIG. 1. In order to prevent an operator (not shown) that is standing between label dispensers 7 and label reels 8 of the cross-web labelers 4, for example for changing the label reel 8, from getting injured by the movement of one of the cross-web labelers 4, a comparatively large safety distance A is provided between the two cross-web labelers 4. The cross-web labelers 4 apply labels 30 to a film web 31.

Figure 2:
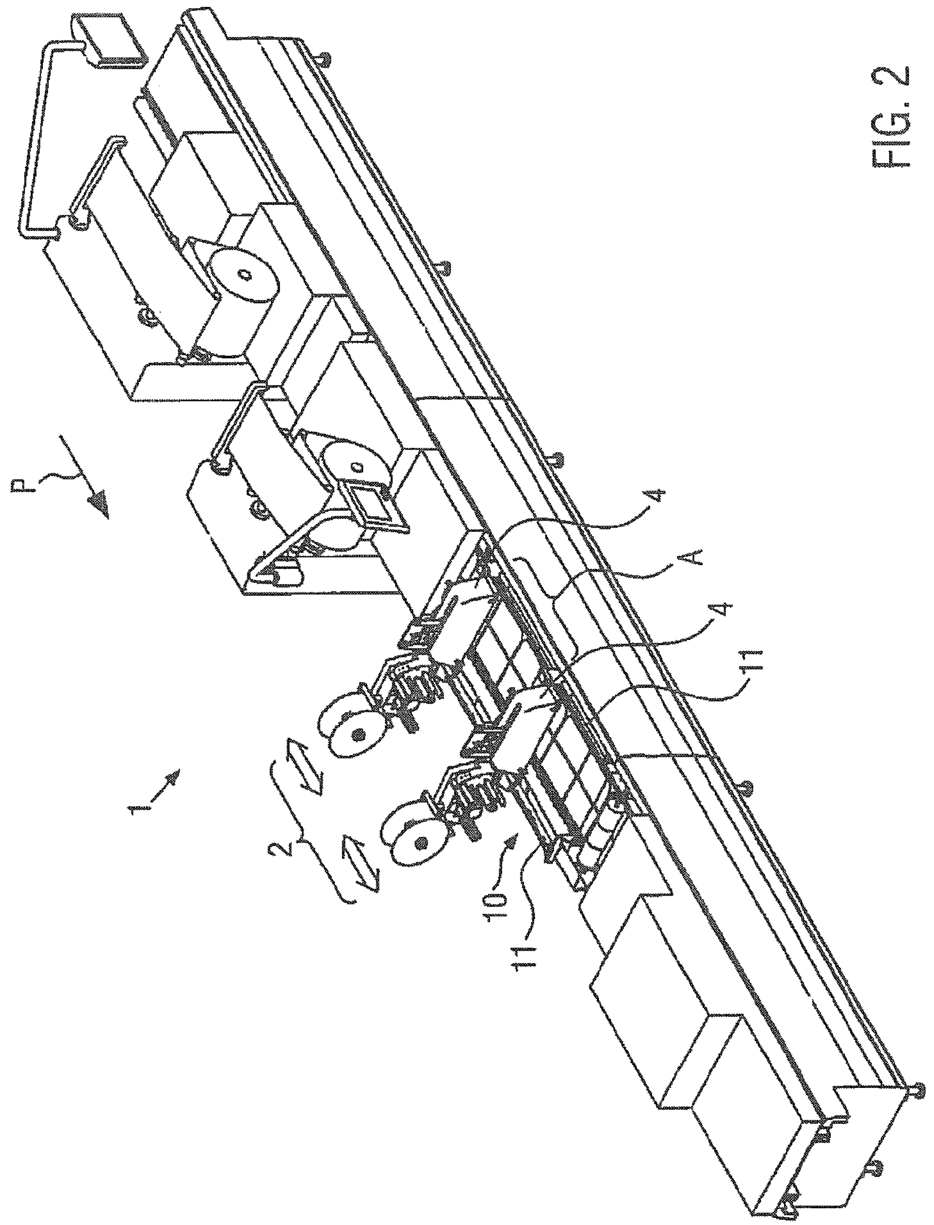
FIG. 2 is a side perspective view of a deep-drawing packaging machine having a labeling device with two cross-web labelers according to one embodiment of the present invention.
Figure 3:
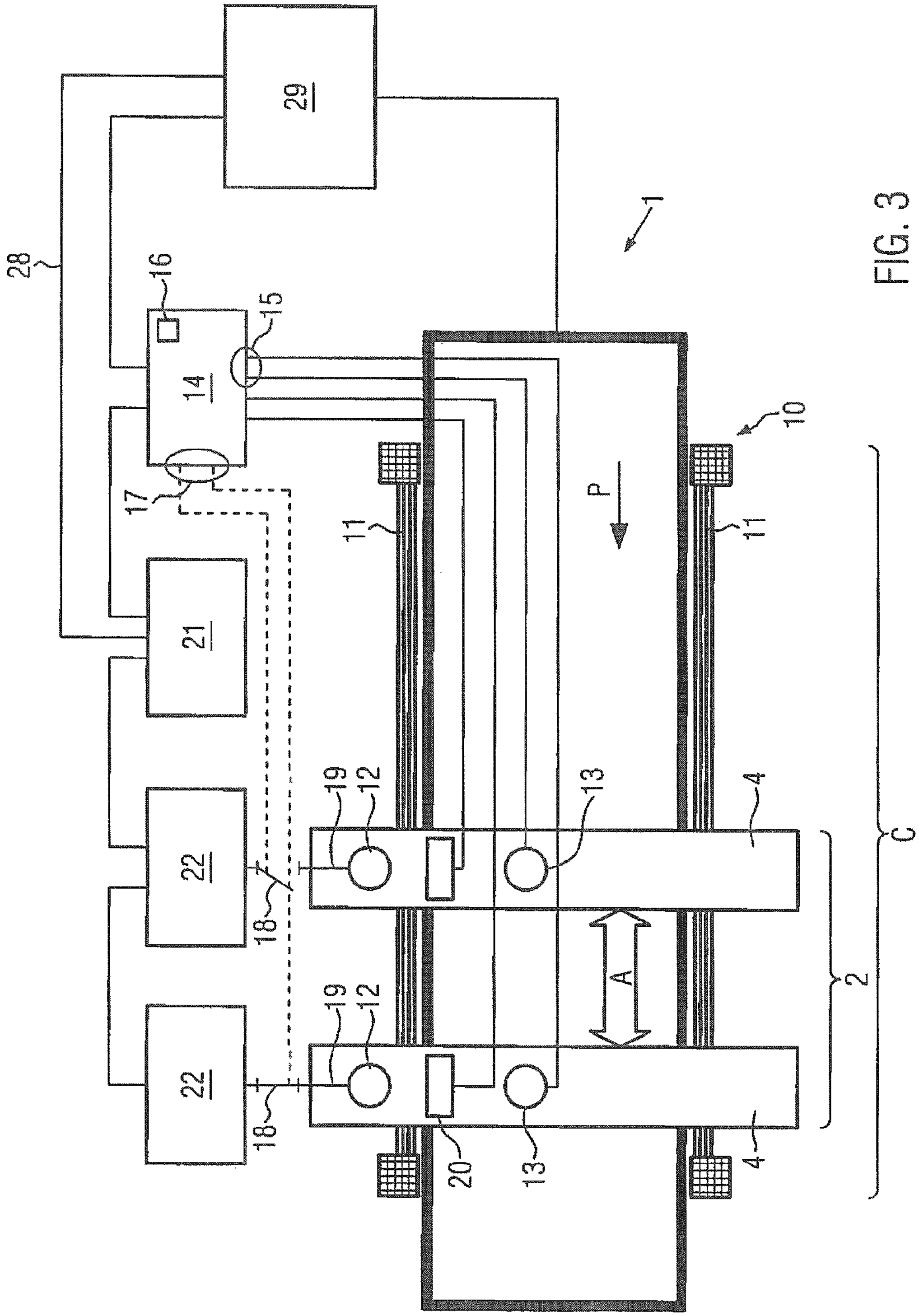
FIG. 3 is a schematic diagram of the labeling device of FIG. 2 illustrating a safety controller.

FIG. 2 shows a packaging machine 1 including a labeling device 2 according to one embodiment of the present invention, which comprises two cross-web labelers 4. Both cross-web labelers 4 may be arranged on one common guide system 10. The common guide system 10 may comprise two guides 11 on which the cross-web labelers 4 can each be displaced in and opposite to the production direction P. Each cross-web labeler 4 can be displaced along the guides 11 by means of a drive 12, such as a servomotor or stepper motor (e.g., by a toothed belt drive), as best shown in FIG. 3. The drive 12 may also be provided as a linear direct drive or be a three-phase asynchronous motor or DC motor. Each cross-web labeler 4 may include a distance measuring system 13, which is illustrated in more detail in FIG. 3. The distance A in FIGS. 2 and 3 is the distance between the two cross-web labelers 4 relative to each other. The distance A can be measured as clear width between the two cross-web labelers 4 in the production direction P of the deep-drawing packaging machine 1 (e.g., the distance between the two label reels 8).

FIG. 3 shows a schematic top view of the deep-drawing packaging machine 1 including the labeling device 2. The two cross-web labelers 4 can be displaced along the guides 11 of the common guide system 10. A movement controller 21 can control the movement for each individual cross-web labeler 4. The cross-web labelers 4 can be displaced synchronously or independently of each other. The movement controller 21 can control the respective drive 12 by a power supply 22 associated with the respective drive 12, which may be configured as an upstream control electronics 22. In one embodiment, as shown in FIG. 3, the drive 12 is a stepper motor and the control electronics 22 is a stepper motor controller. Also, the drive 12 may be a servomotor and the energy supply/control electronics 22 may be a servo controller.

Each cross-web labeler 4 can include a distance measuring system 13 which may be connected to a safety controller 14 by inputs 15 so as to communicate the position of the respective cross-web labeler 4 along the guide system 10 to the safety controller 14. The distance measuring system 13 may be an absolute measuring system (e.g., an absolute shaft encoder). The distance measuring system 13 can also be an incremental shaft encoder, and a reference sensor 20 may be provided so as to reference the cross-web labelers 4 each time after the deep-drawing packaging machine 1 was switched on. In such an embodiment, the reference sensor 20 may correspond to a fixed value to which the position of the cross-web labeler 4 is set in the safety controller 14. The reference sensors 20 can be connected to the safety controller 14.

The safety controller 14 can be an external safety controller as it is not required to be part of the movement controller 21 or a controller 29 of the deep-drawing packaging machine 1. The safety controller 14 may comprise a processor 16 which can include a program that continuously evaluates the signals, such as, for example, information about the position of the cross-web labelers 4, by means of the distance measuring systems 13. The processor 16 may then calculate, on the basis thereof, the distance A. In doing so, the program compares the distance A with a value for the safety distance (e.g., 500 mm), which is invariably provided in the program. If the program, and respectively, the processor 16, determines that the current distance A of the cross-web labelers 4 relative to each other is below the predefined safety distance, the processor 16 may switch relay outputs 17 to open switching contacts 18 in order to disconnect connecting lines 19 leading from the power supplies 22 to the drives 12 and thereby interrupt the power supply of the drives 12. This ensures that one or both cross-web labelers 4 is/are reliably stopped. FIG. 3 shows the switching contact 18 on the right in an opened position disconnecting the power supply 22 from the associated drive 12, while the switching contact 18 shown on the left is in a closed position, according to one embodiment of the present invention. The guide system 10 may represent the shared work area C along which both cross-web labelers 4 can move.

It would also be conceivable to control both switching contacts by a single, shared relay output 17 on the safety controller 14.

The safety controller 14 may comprise several modes. After the above-described mode for checking the safety distance, another mode for a synchronous displacement of two cross-web labelers 4 in one common movement direction may be provided. This mode refers to the application that two cross-web labelers 4 are displaced together and synchronously, at a predefined distance A, in or opposite to the production direction P to apply labels 30 to the film web 31. The selection of the different modes, and also the communication of the predefined distance A to the safety controller 14, may be carried out by the controller 29 of the deep-drawing packaging machine 1.

The controllers are preferably connected to each other by a bus system 28. During the synchronous displacement of the two cross-web labelers 4, the safety controller 14 can check that no distance variation occurs within a predefinable tolerance (e.g., +/−1 mm). In such an embodiment, the current distance A can be calculated by means of the distance measuring systems 13 and compared with the predefinable distance. In the event of a fault, the drives 12 may be switched off reliably by relay outputs 17.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A labeling device comprising:

two cross-web labelers, each said cross-web labeler comprising:
- a motor drive associated with a power supply connected to the motor drive by a connecting line; and
- a distance measuring system, wherein each distance measuring system is an absolute measuring system;
- wherein both cross-web labelers have a common work area; and a safety controller comprising:
- inputs for the distance measuring systems of each said cross-web labeler; and
- at least one relay output for disconnecting the line connection between the power supply and the motor drive of at least one of the two cross-web labelers.

2. A labeling device according to claim 1, wherein the safety controller further comprises a processor with a program and the safety controller is configured to calculate a distance between the two cross-web labelers on the basis of information from the distance measuring systems.

3. A labeling device according to claim 2, wherein the safety controller switches the at least one relay output such that the motor drive of each said cross-web labeler is disconnected from the respective power supply using one or more switching contacts when the calculated distance between the two cross-web labelers is below a predetermined safety distance between the cross-web labelers defined in the program of the safety controller.

4. A labeling device according to claim 3, wherein the predetermined safety distance is at least 500 mm.

5. A labeling device according to claim 1, wherein the labeling device is disposed on a deep-drawing packaging machine.

6. A method for operating a labeling device on a deep-drawing packaging machine comprising two cross-web labelers, each cross-web labeler having a motor drive with a power supply, and each said cross-web labeler sharing one common work area, the method comprising the steps of:
- determining a calculated distance between the two cross-web labelers using a safety controller that comprises a plurality of distance measuring systems, each distance measuring system being an absolute measuring system, and wherein each of the plurality of distance measuring systems is associated with one of the motor drives; and
- disconnecting the motor drives of the cross-web labelers from the respective power supplies when the calculated distance is below a predefined safety distance.

7. A method according to claim 6, wherein the predefined safety distance is invariable.

* * * * *